(12) United States Patent
Otsuka et al.

(10) Patent No.: US 11,762,248 B2
(45) Date of Patent: Sep. 19, 2023

(54) LIGHT CONTROL FILM AND LIQUID CRYSTAL DISPLAY DEVICE

(71) Applicant: NITTO DENKO CORPORATION, Ibaraki (JP)

(72) Inventors: Masanori Otsuka, Ibaraki (JP); Hiroyuki Takemoto, Ibaraki (JP); Mariko Hirai, Ibaraki (JP); Jin Yoshikawa, Ibaraki (JP); Akiko Sugino, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/050,889

(22) PCT Filed: Apr. 12, 2019

(86) PCT No.: PCT/JP2019/015928
§ 371 (c)(1),
(2) Date: Oct. 27, 2020

(87) PCT Pub. No.: WO2019/208261
PCT Pub. Date: Oct. 31, 2019

(65) Prior Publication Data
US 2021/0231997 A1 Jul. 29, 2021

(30) Foreign Application Priority Data
Apr. 27, 2018 (JP) .................. 2018-087509

(51) Int. Cl.
*G02F 1/1347* (2006.01)
*G02F 1/1335* (2006.01)
(Continued)

(52) U.S. Cl.
CPC ...... *G02F 1/13476* (2013.01); *G02F 1/13362* (2013.01); *G02F 1/13439* (2013.01);
(Continued)

(58) Field of Classification Search
CPC .......... G02F 1/13476; G02F 1/133562; G02F 1/13756; G02F 1/133305
See application file for complete search history.

(56) References Cited

U.S. PATENT DOCUMENTS

| 5,686,979 A | 11/1997 | Weber et al. |
| 5,877,829 A * | 3/1999 | Okamoto ............. G02F 1/1334 349/110 |

(Continued)

FOREIGN PATENT DOCUMENTS

| EP | 3 438 733 A1 | 2/2019 |
| JP | 10-319384 A | 12/1998 |

(Continued)

OTHER PUBLICATIONS

International Search Report dated Jul. 2, 2019, issued in counterpart International Application No. PCT/JP2019/015928 (2 pages).

(Continued)

*Primary Examiner* — Lucy P Chien
(74) *Attorney, Agent, or Firm* — WHDA, LLP (57) ABSTRACT

The present invention provides a light control film, including: a first transparent substrate; a first transparent electrode layer; a light control layer which contains a liquid crystal compound, and which enables switching between a light transmitting state and a light scattering state in accordance with a voltage to be applied; a second transparent electrode layer; and a second transparent substrate in the stated order, wherein the first transparent substrate has a front retardation of 50 nm or less, wherein the second transparent substrate has a front retardation of 50 nm or less, and wherein the light control film has a total light transmittance of from 85% to 99% in the light transmitting state.

12 Claims, 6 Drawing Sheets

(51) Int. Cl.
   *G02F 1/137* (2006.01)
   *G02F 1/1333* (2006.01)
   *G02F 1/13357* (2006.01)
   *G02F 1/1343* (2006.01)
   *F21V 8/00* (2006.01)

(52) U.S. Cl.
   CPC .... *G02F 1/13756* (2021.01); *G02F 1/133305* (2013.01); *G02F 1/133502* (2013.01); *G02F 1/133528* (2013.01); *G02F 1/133562* (2021.01); *G02B 6/0038* (2013.01); *G02B 6/0053* (2013.01); *G02B 6/0055* (2013.01); *G02F 2203/01* (2013.01)

(56) References Cited

U.S. PATENT DOCUMENTS

| | | | |
|---|---|---|---|
| 6,064,457 A * | 5/2000 | Aminaka | G02F 1/133632 428/1.31 |
| 6,369,871 B1 * | 4/2002 | Hanada | G02F 1/1333 349/158 |
| 6,559,909 B1 * | 5/2003 | Kushida | G02F 1/13362 349/62 |
| 7,439,000 B2 * | 10/2008 | Bai | C09K 19/2007 430/20 |
| 7,821,611 B2 | 10/2010 | Uehara et al. | |
| 9,777,137 B2 | 10/2017 | Fujii et al. | |
| 2001/0030724 A1 * | 10/2001 | Umemoto | G02F 1/1333 349/113 |
| 2003/0206257 A1 * | 11/2003 | Choi | G02F 1/133555 349/113 |
| 2007/0052879 A1 | 3/2007 | Uehara et al. | |
| 2007/0263145 A1 * | 11/2007 | Ishikawa | G02F 1/133634 349/114 |
| 2008/0170294 A1 * | 7/2008 | Kuroda | G02B 5/3083 359/487.05 |
| 2013/0258570 A1 * | 10/2013 | Nashiki | G06F 3/045 361/679.01 |
| 2014/0093715 A1 | 4/2014 | Fujii et al. | |
| 2016/0356943 A1 | 12/2016 | Choi et al. | |
| 2018/0246318 A1 * | 8/2018 | Shian | G02B 26/06 |
| 2019/0258097 A1 | 8/2019 | He et al. | |

FOREIGN PATENT DOCUMENTS

| | | |
|---|---|---|
| JP | 2005-128363 A | 5/2005 |
| JP | 2006-310085 A | 11/2006 |
| JP | 2007-033813 A | 2/2007 |
| JP | 2007-71953 A | 3/2007 |
| JP | 2007-212816 A | 8/2007 |
| JP | 2010-32821 A | 2/2010 |
| JP | 2013-164434 A | 8/2013 |
| JP | 2015-232647 A | 12/2015 |
| TW | 201040624 A | 11/2010 |
| TW | 201302859 A | 1/2013 |
| TW | 201741731 A | 12/2017 |
| WO | 2018/072399 A1 | 4/2018 |

OTHER PUBLICATIONS

Office Action dated Nov. 21, 2022, issued in counterpart TW application No. 108113653, with English translation. (11 pages).
Office Action dated Jul. 1, 2023, issued in counterpart CN Application No. 201980028460.6, with English Translation. (16 pages).

* cited by examiner

HORIZONTAL DIRECTION

FIG. 4(b)

VERTICAL DIRECTION

LIGHT CONTROL FILM AND LIQUID CRYSTAL DISPLAY DEVICE

TECHNICAL FIELD

The present invention relates to a light control film, and a liquid crystal display apparatus capable of switching between a wide viewing angle and a narrow viewing angle through use of the light control film.

BACKGROUND ART

Typically, liquid crystal display apparatus are required to have a wide viewing angle when used in scenes where a viewer position is not fixed and the apparatus are viewed from every angle (for example, in electronic advertisement and in television sets and personal computers for normal uses). To accomplish a wide viewing angle, various technologies using a diffusion sheet, a prism sheet, a wide viewing angle liquid crystal panel, a wide viewing angle polarizing plate, and the like are being investigated. Meanwhile, liquid crystal display apparatus capable of displaying an image at a narrow viewing angle (for example, liquid crystal display apparatus for use in cellular phones, notebook computers used in public places, automated teller machines, and seat monitors on rides) are also required for the prevention of screen peeking and other purposes when the viewer position is limited within a narrow range.

In Patent Literature 1, as a liquid crystal display apparatus capable of switching between a wide viewing angle and a narrow viewing angle, there has been proposed a liquid crystal display apparatus including a liquid crystal panel, viewing angle control means, a prism sheet, and a light guide plate in the stated order from a viewer side. In the liquid crystal display apparatus of Patent Literature 1, the prism sheet condenses light emitted from the light guide plate to the viewing angle control means, and the viewing angle control means changes the transmission state of the light, thereby being capable of controlling the widening and narrowing of the viewing angle.

However, along with an increase in awareness of privacy and information management in recent years, it is required to further narrow the viewing angle at the time of narrow viewing angle display.

CITATION LIST

Patent Literature

[PTL 1] JP 2006-310085 A

SUMMARY OF INVENTION

Technical Problem

The present invention has been made in order to solve the above-mentioned problem inherent in the related art, and an object of the present invention is to provide a liquid crystal display apparatus capable of switching between a wide viewing angle and a narrow viewing angle and achieving a narrower viewing angle at the time of narrow viewing angle display.

Solution to Problem

According to one aspect of the present invention, there is provided a light control film, including: a first transparent substrate; a first transparent electrode layer; a light control layer which contains a liquid crystal compound, and which enables switching between a light transmitting state and a light scattering state in accordance with a voltage to be applied; a second transparent electrode layer; and a second transparent substrate in the stated order, wherein the first transparent substrate has a front retardation of 50 nm or less, wherein the second transparent substrate has a front retardation of 50 nm or less, and wherein the light control film has a total light transmittance of from 85% to 99% in the light transmitting state.

In one embodiment, the light control film further includes a refractive index adjusting layer between the first transparent substrate and the first transparent electrode layer and/or between the second transparent substrate and the second transparent electrode layer.

In one embodiment, the light control film further includes an antireflection layer on an opposite side to a side of the first transparent substrate on which the first transparent electrode layer is arranged and/or on an opposite side to a side of the second transparent substrate on which the second transparent electrode layer is arranged.

In one embodiment, the first transparent substrate and the second transparent substrate each contain a cycloolefin-based resin.

In one embodiment, the light control film has a haze of 15% or less in the light transmitting state.

In one embodiment, the light control film has a total light transmittance of from 85% to 99% in each of the light transmitting state and the light scattering state.

According to another aspect of the present invention, there is provided a liquid crystal display apparatus. The liquid crystal display apparatus includes in an order from a viewer side: a liquid crystal panel including a liquid crystal cell, a viewer-side polarizing plate arranged on the viewer side of the liquid crystal cell, and a back surface-side polarizing plate arranged on an opposite side to the viewer side of the liquid crystal cell; the light control film; and a surface light source device configured to emit, from a light emitting surface opposed to the light control film, light having directivity in an approximately normal direction of the light emitting surface.

In one embodiment, the surface light source device is configured to emit light which has directivity in the approximately normal direction of the light emitting surface opposed to the light control film, and which contains a linearly polarized light component that vibrates in a specific direction at a high ratio, and a vibration direction of the linearly polarized light component is approximately parallel to a transmission axis of the back surface-side polarizing plate.

In one embodiment, the surface light source device includes a light source unit, and a light guide plate configured to cause light from the light source unit to enter from a side surface opposed to the light source unit, and to emit the light from a viewer-side surface, and the linearly polarized light component vibrates in a plane approximately parallel to a light guide direction of the light of the light guide plate.

Advantageous Effects of Invention

Through use of the light control film of the present invention, in a liquid crystal display apparatus having performance of switching between a wide viewing angle and a narrow viewing angle, a narrower viewing angle can be achieved at the time of narrow viewing angle display. In addition, according to one embodiment of the present invention, in a liquid crystal display apparatus having high resolution, a wide viewing angle and a narrow viewing angle can be switched while high brightness is maintained.

DESCRIPTION OF EMBODIMENTS

Now, embodiments of the present invention are described with reference to the drawings, but the present invention is not limited to these embodiments. As used herein, a first transparent substrate and a second transparent substrate are sometimes collectively referred to as "transparent substrate", and a first transparent electrode layer and a second transparent electrode layer are sometimes collectively referred to as "transparent electrode layer". In addition, a laminate including the transparent substrate and the transparent electrode layer is sometimes referred to as "transparent conductive film". Further, the simple expression "perpendicular" as used herein may include a substantially perpendicular state or an approximately perpendicular state. Specifically, the expressions "perpendicular", "substantially perpendicular", and "approximately perpendicular" as used herein include a case in which an angle formed by two directions is 90°±10°, preferably 90°±7°, more preferably 90°±5°. Similarly, the simple expression "parallel" as used herein may include a substantially parallel state or an approximately parallel state. Specifically, the expressions "parallel", "substantially parallel", and "approximately parallel" as used herein include a case in which an angle formed by two directions is 0°±10°, preferably 0°±7°, more preferably 0°±5°.

A. Light Control Film

A-1. Overall Configuration of Light Control Film

Figure 1:
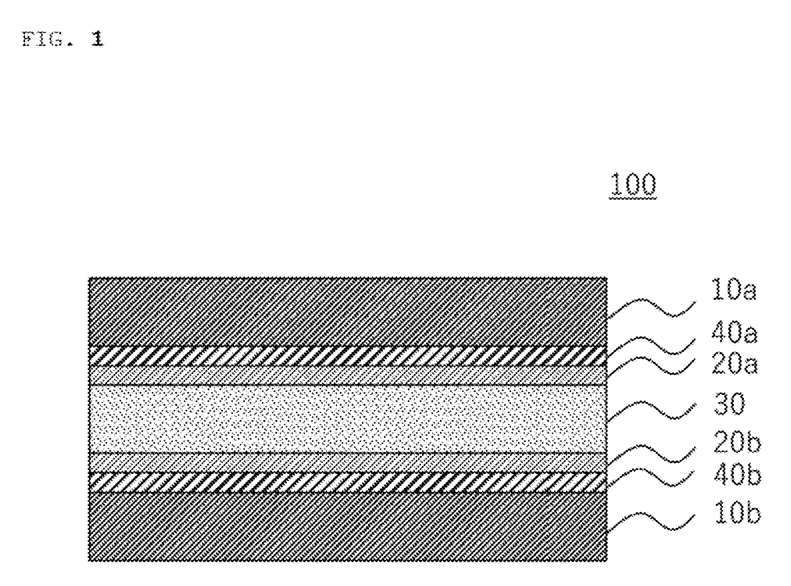
FIG. 1 is a schematic sectional view of a light control film according to one embodiment of the present invention.

FIG. 1 is a schematic sectional view of a light control film according to one embodiment of the present invention. A light control film 100 includes a first transparent substrate 10a, a first transparent electrode layer 20a, a light control layer 30, a second transparent electrode layer 20b, and a second transparent substrate 10b in the stated order. Refractive index adjusting layers 40a and 40b are formed between the first transparent substrate 10a and the first transparent electrode layer 20a and between the second transparent substrate 10b and the second transparent electrode layer 20b, respectively. The refractive index adjusting layer 40a and/or 40b may be omitted as long as the effects of the present invention are obtained. In addition, although not shown, an antireflection layer may be formed on an outer side of the first transparent substrate 10a (in other words, on an opposite side to a side on which the first transparent electrode layer 20a is arranged) and/or on an outer side of the second transparent substrate 10b (in other words, on an opposite side to a side on which the second transparent electrode layer 20b is arranged).

The total thickness of the light control film is, for example, from 50 µm to 250 µm, preferably from 80 µm to 200 µm.

The light control film has a parallel light transmittance of preferably from 80% to 99%, more preferably from 83% to 99% in a light transmitting state. In the case where the parallel light transmittance in the light transmitting state falls within the above-mentioned ranges, when the light control film is incorporated into a liquid crystal display apparatus, light having directivity, which has entered from a backlight side, can be transmitted under a state in which the directivity is maintained. Therefore, a narrower viewing angle can be achieved.

The light control film has a total light transmittance of typically from 85% to 99% in the light transmitting state. In addition, the light control film has a total light transmittance of preferably from 85% to 99%, more preferably from 88% to 95% in both the light transmitting state and a light scattering state. In the case where the total light transmittance falls within the above-mentioned ranges, even when the light control film is incorporated into a high-definition liquid crystal display apparatus (for example, having a resolution of 150 ppi or more), a wide viewing angle and a narrow viewing angle can be switched while a decrease in brightness is suppressed.

The light control film may have a haze of preferably 15% or less, more preferably 10% or less in the light transmitting state. In the case where the haze in the light transmitting state falls within the above-mentioned ranges, when the light control film is incorporated into a liquid crystal display apparatus, narrower viewing angle display can be achieved.

The light control film may have a haze of preferably 30% or more, more preferably from 50% to 99% in the light scattering state. In the case where the haze in the light scattering state falls within the above-mentioned ranges, when the light control film is incorporated into a liquid crystal display apparatus, light having directivity, which has entered from a backlight side, can be scattered, and hence a wide viewing angle can be suitably achieved.

As described later, the degree of light diffusion (as a result, haze) of the light control film changes depending on a voltage to be applied. In one embodiment, the case in which the haze of the light control film is a predetermined value or more (for example, 30% or more, preferably 50% or more) may be defined as the light scattering state, and the case in which the haze is less than the predetermined value (for example, 15% or less, preferably 10% or less) can be defined as the light transmitting state. The voltage (driving voltage) to be applied to the light control film for controlling the transmitting state (scattering state) of light is, for example, 100 V or less, preferably 50 V or less.

A-2. First Transparent Substrate

The first transparent substrate has a front retardation of 50 nm or less, preferably from 0 nm to 30 nm, more preferably from 0 nm to 10 nm. In the case where the retardation value falls within the above-mentioned ranges, as described later in the section B, when the light control film is used in a liquid crystal display apparatus capable of switching between a wide viewing angle and a narrow viewing angle, narrower viewing angle display can be achieved. As used herein, a front retardation ($R_0$) is a value obtained by $R_0=(nx-ny)\cdot d$, where "nx" represents a refractive index in a direction in which an in-plane refractive index is maximum at 23° C. (that is, a slow axis direction), "ny" represents a refractive index in a direction perpendicular to the slow axis in the plane (that is, a fast axis direction) at 23° C., and "d" (nm) represents a thickness of a film. Unless otherwise specified, the front retardation ($R_0$) refers to a value at a wavelength of 590 nm.

The first transparent substrate is typically a polymer film containing a thermoplastic resin as a main component. The polymer film is excellent in smoothness and wettability with respect to a composition for forming a transparent electrode layer, and can also greatly improve the productivity by continuous production using a roll.

As the thermoplastic resin, from the viewpoint of obtaining a desired front retardation, cycloolefin-based resins, such as polynorbornene, polycarbonate-based resins, acrylic resins, and the like are preferably used. Of those, cycloolefin-based resins having excellent heat resistance are preferred.

The polynorbornene refers to a (co)polymer obtained by using a norbornene-based monomer having a norbornene ring as part or the entirety of starting materials (monomers). Examples of the norbornene-based monomer include: norbornene, alkyl and/or alkylidene substituted products thereof, such as 5-methyl-2-norbornene, 5-dimethyl-2-norbornene, 5-ethyl-2-norbornene, 5-butyl-2-norbornene, and 5-ethylidene-2-norbornene, and polar group (e.g., halogen) substituted products thereof; dicyclopentadiene and 2,3-dihydrodicyclopentadiene; dimethanooctahydronaphthalene, alkyl and/or alkylidene substituted products thereof, and polar group (e.g., halogen) substituted products thereof, such as 6-methyl-1,4:5,8-dimethano-1,4,4a,5,6,7,8, 8a-octahydronaphthalene, 6-ethyl-1,4:5,8-dimethano-1,4,4a,5,6,7, 8,8a-octahydronaphthalene, 6-ethylidene-1,4:5,8-dimethano-1,4,4a,5,6,7,8,8a-octahydronaphthalene, 6-chloro-1, 4:5,8-dimethane-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,3-dimethano-1,4,4a,5,6,7, 8,8a-octahydronaphthalene, and 6-methoxycarbonyl-1,4:5, 8-dimethano-1,4,4a,5,6,7,8,8a-octahydronaphthalene; and trimers or tetramers of cyclopentadiene, such as 4,9:5,8-dimethano-3a,4,4a,5,8,8a,9,9a-octahydro-1H-benzoindene and 4,11:5,10:6,9-trimethano-3a4,4,4a,5,5a,6,9,9a,10,10a,11, 11a-dodecahydro-1H-cyclopentaanthracene.

Various products are commercially available as the polynorbornene. Specific examples thereof include products available under the product names "ZEONEX" and "ZEONOR" from Zeon Corporation, a product available under the product name "Arton" from JSR Corporation, a product available under the product name "Topas" from TICONA, and a product available under the product name "APEL" from Mitsui Chemicals, Inc.

The thickness of the first transparent substrate is preferably 150 μm or less, more preferably from 5 μm to 100 μm, still more preferably from 20 μm to 80 μm.

A-3. First Transparent Electrode Layer

The first transparent electrode layer may be formed, for example, through use of a metal oxide, such as indium tin oxide (ITO), zinc oxide (ZnO), or tin oxide ($SnO_2$). Alternatively, the first transparent electrode layer may be formed of a metal nanowire, such as a silver nanowire (AgNW), a carbon nanotube (CNT), an organic conductive film, a metal layer, or a laminate thereof. The first transparent electrode layer may be patterned into a desired shape depending on the purpose.

The total light transmittance of the first transparent electrode layer is preferably 85% or more, more preferably 90% or more.

The surface resistance value of the first transparent electrode layer is preferably from 0.1 Ω/□ to 1,000 Ω/□, more preferably from 0.5 Ω/□ to 500 Ω/□, still more preferably from 1 Ω/□ to 250 Ω/□.

The thickness of the first transparent electrode layer is, for example, from 0.01 μm to 0.10 μm, preferably from 0.01 μm to 0.06 μm, more preferably from 0.01 μm to 0.045 μm. When the thickness of the first transparent electrode layer falls within the above-mentioned ranges, an electrode layer excellent in conductivity and light transmitting property can be obtained.

The first transparent electrode layer may be formed directly on the first transparent substrate having the refractive index adjusting layer formed thereon as required through use of a method such as sputtering. Alternatively, the first transparent electrode layer may toe formed on a support substrate through use of a method such as sputtering, and may be arranged on one side of the first transparent substrate through intermediation of the support substrate.

A-4. Light Control Layer

A light control layer contains a liquid crystal compound. The light control layer containing the liquid crystal compound is typically formed by dispersing the liquid crystal compound in a polymer matrix. In the light control layer, the degree of light scattering is changed by changing the degree of alignment of the liquid crystal compound based on the voltage application state, and with this, the light transmitting state and the light scattering state can be switched.

In one embodiment, the light control layer is in the light transmitting state at the time of application of a voltage, and the light control layer is in the light scattering state at the time of application of no voltage (normal mode). In this embodiment, the liquid crystal compound is not aligned at the time of application of no voltage, resulting in the light scattering state. When a voltage is applied, the liquid crystal compound is aligned, and the refractive index of the liquid crystal compound and the refractive index of the polymer matrix match with each other, resulting in the light transmitting state.

In another embodiment, the light control layer is in the light scattering state at the time of application of a voltage, and the light control layer is in the light transmitting state at the time of application of no voltage (reverse mode). In this embodiment, with an alignment film arranged on a surface of the transparent electrode layer, the liquid crystal compound is aligned at the time of application of no voltage, resulting in the light transmitting state. When a voltage is applied, the alignment of the liquid crystal compound is disturbed, resulting in the light scattering state.

Examples of the light control layer as described above include a light control layer containing a polymer-dispersed liquid crystal and a light control layer containing a polymer-network liquid crystal. The polymer-dispersed liquid crystal has a structure in which a liquid crystal compound in the form of droplets is dispersed in a polymer matrix. The polymer-network liquid crystal has a structure in which a liquid crystal compound is dispersed in a polymer network. The liquid crystal has a continuous phase in the polymer network.

In the case of the polymer-dispersed liquid crystal, the average particle diameter of droplets of the liquid crystal compound may be, for example, from 2 μm to 10 μm. In the case of the polymer-network liquid crystal, the average diameter of liquid crystal domains formed of a polymer network is, for example, from 3 μm to 10 μm. When the average diameter is excessively small, there may arise a problem in that the scattering property on a long wavelength side becomes insufficient at the time of wide viewing angle display, with the result that a neutral hue is not obtained. Meanwhile, when the average diameter is excessively large, backward reflection and scattering are increased, with the result that the light transmittance may be decreased.

As the liquid crystal compound, any appropriate liquid crystal compound of a non-polymeric type may be used as long as the effects of the present invention are obtained. For example, a liquid crystal compound of a non-polymeric type having a birefringence Δn (=$n_e$–$n_o$; $n_e$ represents a refractive index in a long-axis direction of a liquid crystal compound molecule, and $n_o$ represents a refractive index in a short-axis direction of the liquid crystal compound molecule) of from 0.05 to 0.30 at a wavelength of 589 nm may be preferably used. When the birefringence of the liquid crystal compound is excessively small, there may arise a problem in that the sufficient scattering property is not obtained at the time of wide viewing angle display. In addition, when the birefringence of the liquid crystal compound is excessively large, backward reflection and scattering are increased, with the result that the light transmittance may be decreased. The birefringence Δn of the liquid crystal compound is preferably from 0.05 to 0.12.

The liquid crystal compound may have positive dielectric anisotropy or negative dielectric anisotropy. Examples of the liquid crystal compound may include nematic, smectic, and cholesteric liquid crystal compounds. A nematic liquid crystal compound is preferably used because excellent transparency can be achieved in the light transmitting state. Examples of the nematic liquid crystal compound include a biphenyl-based compound, a phenyl benzoate-based compound, a cyclohexylbenzene-based compound, an azoxybenzene-based compound, an azobenzene-based compound, an azomethine-based compound, a terphenyl-based compound, a biphenyl benzoate-based compound, a cyclohexylbiphenyl-based compound, a phenylpyridine-based compound, a cyclohexylpyrimidine-based compound, a cholesterol-based compound, and a fluorine-based compound.

The content of the liquid crystal compound in the light control layer is, for example, from 30 wt % to 95 wt %, preferably from 35 wt % to 95 wt %, more preferably from 40 wt % to 90 wt %.

A resin for forming the polymer matrix may be appropriately selected depending on, for example, the light transmittance and the refractive index of the liquid crystal compound. The resin may be an optically isotropic resin or may be an optically anisotropic resin. In one embodiment, the resin is an active energy ray-curable resin. For example, a liquid crystal polymer obtained by curing a polymerizable liquid crystal compound, a (meth)acrylic resin, a silicone-based resin, an epoxy-based resin, a fluorine-based resin, a polyester-based resin, and a polyimide resin may be preferably used.

The content of the polymer matrix in the light control layer is preferably from 1 wt % to 60 wt %, more preferably from 5 wt % to 50 wt %. When the content of the polymer matrix is less than 1 wt %, a problem of, for example, a reduction in adhesiveness with a transparent conductive film may occur. Meanwhile, when the content of the polymer matrix is more than 60 wt %, a problem of, for example, an increase in driving voltage or a reduction in light control function may occur.

A-5. Second Transparent Substrate

The same description as that of the first transparent substrate is applicable to the second transparent substrate. The second transparent substrate may have the same configuration as that of the first transparent substrate or a different configuration therefrom A-6. Second Transparent Electrode Layer The same description as that of the first transparent electrode layer is applicable to the second transparent electrode layer. The second transparent electrode layer may have the same configuration as that of the first transparent electrode layer or a different configuration therefrom A-7. Refractive Index Adjusting Layer In the present invention, a refractive index adjusting layer may be formed between the transparent substrate and the transparent electrode layer. Through formation of the refractive index adjusting layer, interface reflection between the transparent substrate and the transparent electrode layer is suppressed. Therefore, when the light control film is incorporated into a liquid crystal display apparatus, the refractive index adjusting layer can contribute to reduction of reflection and scattering to a backlight side (as a result, improvement of a light transmittance). The refractive index adjusting layer may be formed of a single layer or a laminate of two or more layers.

The refractive index of the refractive index adjusting layer is preferably from 1.3 to 1.8, more preferably from 1.35 to 1.7, still more preferably from 1.40 to 1.65. With this, the interface reflection between the transparent substrate and the transparent electrode layer can be suitably reduced.

The refractive index adjusting layer is formed of an inorganic substance, an organic substance, or a mixture of an inorganic substance and an organic substance. As a material for forming the refractive index adjusting layer, there are given: inorganic substances, such as NaF, $Na_3AlF_6$, LiF, $MgF_2$, $CaF_2$, $SiO_2$, $LaF_3$, $CeF_3$, $Al_2O_3$, $TiO_2$, $Ta_2O_5$, $ZrO_2$, ZnO, ZnS, and $SiO_x$ ("x" represents 1.5 or more and less than 2); and organic substances, such as an acrylic resin, an epoxy resin, a urethane resin, a melamine resin, an alkyd resin, and a siloxane-based polymer. In particular, a thermosetting resin formed of a mixture of a melamine resin, an alkyd resin, and an organic silane condensate is preferably used as the organic substance.

The refractive index adjusting layer may contain nanoparticles having an average particle diameter of from 1 nm to 100 nm. When the refractive index adjusting layer contains the nanoparticles, the refractive index of the refractive index adjusting layer itself can be easily adjusted. The average particle diameter of the nanoparticles used in the refractive index adjusting layer is preferably from 5 nm to 30 nm.

The content of the nanoparticles in the refractive index adjusting layer is preferably from 0.1 wt % to 90 wt %. In addition, the content of the nanoparticles in the refractive index adjusting layer is more preferably from 10 wt % to 80wt %, still more preferably from 20 wt % to 70 wt %.

As an inorganic oxide for forming the nanoparticles, there are given, for example, silicon oxide (silica), hollow nanosilica, titanium oxide, aluminum oxide, zinc oxide, tin oxide, zirconium oxide, and niobium oxide. Of those, silicon oxide (silica), titanium oxide, aluminum oxide, zinc oxide, tin oxide, zirconium oxide, and niobium oxide are preferred. Those inorganic oxides may be used alone or in combination thereof.

The thickness of the refractive index adjusting layer is preferably from 10 nm to 200 nm, more preferably from 20 nm to 150 nm, still more preferably from 30 nm to 130 nm. When the thickness of the refractive index adjusting layer is excessively small, it is difficult to form a continuous coating film. In addition, when the thickness of the refractive index adjusting layer is excessively large, the transparency of the light control layer in the light transmitting state is liable to be decreased or cracks are liable to occur.

The refractive index adjusting layer may be formed by, for example, a wet method, a coating method, such as a gravure coating method or a bar coating method, a vacuum vapor deposition method, a sputtering method, or an ion plating method through use of the above-mentioned materials.

A-8. Antireflection Layer

In the present invention, an antireflection layer may be formed on the surface of the light control film, that is, on an opposite side to a side of the transparent substrate on which the transparent electrode layer is formed. Through formation of the antireflection layer, when the light control film is incorporated into a liquid crystal display apparatus, the antireflection layer can contribute to reduction of reflection and scattering to a backlight side (as a result, improvement of a light transmittance). The antireflection layer may have an antifouling layer containing a fluorine group-containing silane-based compound, a fluorine group-containing organic compound, or the like on the surface thereof within such a range as not to significantly influence a reflectance.

The reflectance of the antireflection layer for light having a wavelength of 550 nm is preferably from 0.1 % to 1.0 %, more preferably from 0.1 % to 0.5 %.

In the formation of the antireflection layer, in general, the optical thickness (product of a refractive index and a thickness) of a thin film is adjusted so that inverted phases of incident light and reflected light cancel each other. The antireflection layer may be formed of a single-layer thin film or a laminate of two or more thin films. When the antireflection layer is formed as a laminate of two or more thin films having different refractive indices, the reflectance can be reduced within a wideband wavelength range of visible light.

As a material of the thin film for forming the antireflection layer, there are given, for example, an oxide, a nitride, or a fluoride of a metal, a fluorine resin, and a hollow silica-dispersed resin. As a low-refractive index material having a refractive index of from about 1.25 to about 1.55, there are given, for example, a hollow nanosilica-dispersed fluorine resin, silicon oxide, and magnesium fluoride. As a high-refractive index material having a refractive index of from about 1.30 to about 2.40, there are given, for example, titanium oxide, niobium oxide, zirconium oxide, tin-doped indium oxide (ITO), and antimony-doped tin oxide (ATO). Further, in addition to a low-retractive index layer and a high-refractive index layer, as a medium-refractive index layer having a refractive index of from about 1.50 to about 1.85, for example, a thin film made of titanium oxide or a mixture of the low-refractive index material and the high-refractive index material (mixture of titanium oxide and silicon oxide, etc.) may be formed.

As the laminated configuration of the antireflection layer, there are given, for example: a two-layer configuration of a high-refractive index layer having an optical thickness of from about 240 nm to about 260 nm and a low-refractive index layer having an optical thickness of from about 120 nm to about 140 nm; a three-layer configuration of a medium-refractive index layer having an optical thickness of from about 170 nm to about 180 nm, a high-refractive index layer having an optical thickness of from about 60 nm to about 70 nm, and a low-re tractive index layer having an optical thickness of from about 135 nm to about 145 nm; a four-layer configuration of a high-refractive index layer having an optical thickness of from about 25 nm to about 55 nm, a low-refractive index layer having an optical thickness of from about 35 nm to about 55 nm, a high-refractive index layer having an optical thickness of from about 80 nm to about 240 nm, and a low-refractive index layer having an optical thickness of from about 120 nm to about 150 nm; and a five-layer configuration of a low-refractive index layer having an optical thickness of from about 15 nm to about 30 nm, a high-refractive index layer having an optical thickness of from about 20 nm to about 40 nm, a low-refractive index layer having an optical thickness of from about 20 nm to about 40 nm, a high-refractive index layer having an optical thickness of from about 240 nm to about 290 nm, and a low-refractive index layer having an optical thickness of from about 100 nm to about 200 nm. The ranges of the refractive index and thickness of each thin film for forming the antireflection layer are not limited to the above-mentioned examples. In addition, the antireflection layer may be formed of a laminate of six or more thin films.

A formation method for the antireflection layer is not particularly limited, and any of a wet coating method and a dry coating method may be used. The dry coating method, such as vacuum deposition, CVD, sputtering, or electron beam deposition, is preferred because a thin film having a uniform thickness can be formed, and the thickness can be easily adjusted.

A-9. Production Method for Light Control Film

The light control film may be formed by any appropriate method. For example, a pair of transparent conductive films each including a transparent substrate, a transparent electrode layer formed on one side thereof, and a refractive index adjusting layer and/or an antireflection layer as required is prepared. A composition for forming a light control layer is applied onto the surface of the transparent electrode layer of one of the transparent conductive films, to thereby form an application layer. The other transparent conductive film is laminated on the application layer so that the transparent electrode layer is opposed to the application layer, to thereby form a laminate. The application layer is cured with an active energy ray or heat, thereby being capable of obtaining a light control film. In this case, the composition for forming a light control layer contains a monomer (preferably, active energy ray-curable monomer) for forming a polymer matrix and a liquid crystal compound.

Alternatively, a resin for forming a polymer matrix and a liquid crystal compound are dissolved in a common solvent to prepare a solution for forming a light control layer, and the solution for forming a light control layer is applied onto the surface of the transparent electrode layer of the transparent conductive film similar to the above. A solvent is removed by drying to phase-separate the polymer matrix and the liquid crystal (solvent dry phase separation), to thereby form a light control layer. After that, a separate transparent conductive film is laminated on the light control layer so that the transparent electrode layer is opposed to the light control layer, thereby being capable of obtaining a light control film. Instead of the solution for forming a light control layer, a liquid crystal emulsion liquid in which a liquid crystal compound is dispersed in a resin solution obtained by dissolving a polymer matrix resin in a solvent or an aqueous resin emulsion liquid obtained by emulsifying a polymer matrix resin may be used.

B. Liquid Crystal Display Apparatus

B-1. Overall Configuration of Liquid Crystal Display Apparatus

Figure 2:
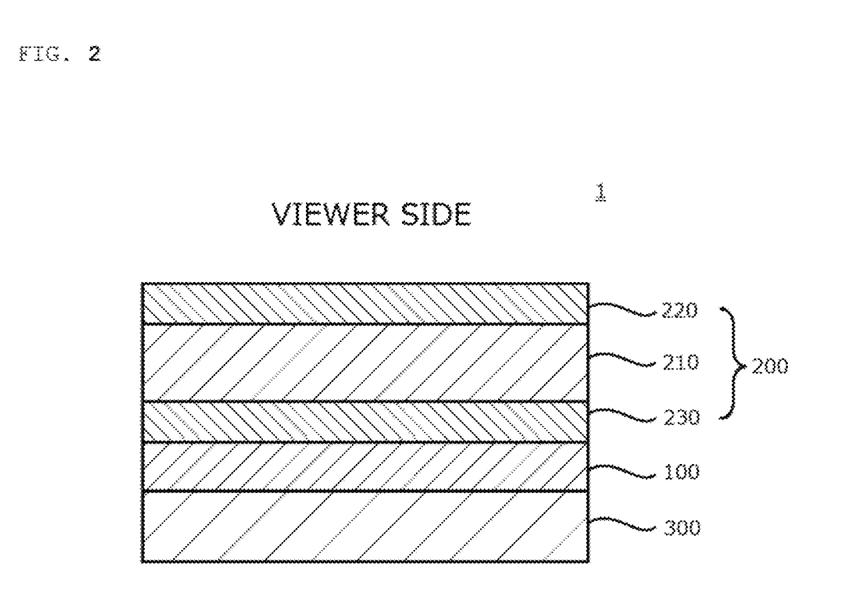
FIG. 2 is a schematic sectional view of a liquid crystal display apparatus according to one embodiment of the present invention.

FIG. 2 is a view for illustrating a liquid crystal display apparatus 1 according to one embodiment of the present invention. The liquid crystal display apparatus 1 according to this embodiment includes in an order from a viewer side: a liquid crystal panel 200 including a liquid crystal cell 210, a viewer-side polarizing plate 220 arranged on the viewer side of the liquid crystal cell 210, and a back surface-side polarizing plate 230 arranged on an opposite side to the viewer side of the liquid crystal cell 210; a light control film 100; and a surface light source device 300 configured to emit light having directivity in an approximately normal direction of a light emitting surface opposed to the light control film 100. Herein, the expression "approximately normal direction" includes a direction within a predetermined angle with respect to the normal direction, for example, a direction within a range of ±10° with respect to the normal direction. In addition, the "light having directivity in an approximately normal direction" refers to light having an intensity distribution in which the peak of a maximum intensity of a brightness intensity distribution is in the approximately normal direction with respect to a light emitting surface in one plane perpendicular to the light emitting surface. For example, it is preferred that the brightness at a polar angle of 40° or more be 2% or less with respect to the brightness in the normal direction (polar angle: 0°), and it is more preferred that the brightness at a polar angle of 50° or more be 1% or less with respect to the brightness in the normal direction (polar angle: 0°). Herein, the polar angle refers to an angle formed by the normal direction (front direction) of the liquid crystal display apparatus and the emitted light from the liquid crystal display apparatus. Although description and the like are omitted, the liquid crystal display apparatus 1 includes, in addition to the above, devices such as ordinary wiring, circuits, and members required for operating the liquid crystal display apparatus.

In the liquid crystal display apparatus 1, the light control film 100 is the light control film described in the section A. Through use of a combination of the surface light source device 300 configured to emit light having directivity in the approximately normal direction of the light emitting surface and the light control film 100 having a high transmittance, when the light control film is under the light transmitting state, the light having directivity can be transmitted through the light control film while maintaining the directivity, with the result that narrow viewing angle display can be suitably achieved. In addition, through setting of the light control film in the light scattering state, the transmitted light can be scattered to switch the narrow viewing angle display to wide viewing angle display.

B-2. Liquid Crystal Panel

The liquid crystal panel typically includes the liquid crystal cell, the viewer-side polarizing plate, which is arranged on the viewer side of the liquid crystal cell, and the back surface-side polarizing plate, which is arranged on the back surface side of the liquid crystal cell. The viewer-side polarizing plate and the back surface-side polarizing plate may be arranged so that the absorption axes thereof are substantially perpendicular or parallel to each other.

The liquid crystal cell includes a pair of substrates and a liquid crystal layer as a display medium sandwiched between the substrates. In a general configuration, on one of the substrates, a color filter and a black matrix are arranged, and on the other substrate, there are arranged switching elements for controlling the electro-optical property of the liquid crystal, scanning lines for giving gate signals to the switching elements and signal lines for giving source signals thereto, and pixel electrodes and a counter electrode. An interval (cell gap) between the substrates may be controlled by spacers and the like. On sides of the substrates, which are brought into contact with the liquid crystal layer, for example, alignment films made of polyimide or the like may be formed.

In one embodiment, the liquid crystal layer includes liquid crystal molecules aligned in a homogeneous alignment under a state in which an electric field is not present. The liquid crystal layer (as a result, liquid crystal cell) as described above typically exhibits a three-dimensional refractive index of nx>ny=nz. Herein, ny=nz includes not only a case in which ny and nz are completely the same, but also a case in which ny and nz are substantially the same. As a typical example of a driving mode using the liquid crystal layer that exhibits the three-dimensional refractive index as described above, there are given, for example, an in-plane switching (IPS) mode and a fringe field switching (FFS) mode. The IPS mode includes a super in-plane switching (S-IPS) mode and an advanced super in-plane switching (AS-IPS) mode, each of which employs a V-shaped electrode, a zigzag electrode, or the like. In addition, the FFS mode includes an advanced fringe field switching (A-FFS) mode and a ultra fringe field switching (U-FFS) mode, each of which employs a V-shaped electrode, a zigzag electrode, or the like.

In another embodiment, the liquid crystal layer includes liquid crystal molecules aligned in a homeotropic alignment under a state in which no electric field is present. The liquid crystal layer (as a result, liquid crystal cell) as described above typically exhibits a three-dimensional refractive index of nz>nx=ny. As a driving mode using the liquid crystal molecules aligned in the homeotropic alignment under the state in which no electric field is present, there is given, for example, a vertical alignment (VA) mode. The VA mode includes a multi-domain VA (MVA) mode.

The viewer-side polarizing plate and the back surface-side polarizing plate each typically include a polarizer and a protective layer arranged on at least one side of the polarizer. The polarizer is typically an absorption-type polarizer.

The transmittance of the absorption-type polarizer (also referred to as single layer transmittance) at a wavelength of 589 nm is preferably 41% or more, more preferably 42% or more. The theoretical upper limit of the single layer transmittance is 50%. In addition, the polarization degree thereof is preferably from 99.5% to 100%, more preferably from 99.9% to 100%. As long as the polarization degree falls within the above-mentioned ranges, contrast in the front direction can be further increased when the polarizer is used in a liquid crystal display apparatus.

Any appropriate polarizer may be adopted as the polarizer. Examples thereof include a polarizer obtained by uniaxially stretching a hydrophilic polymer film such as a polyvinyl alcohol-based film, a partially formalized polyvinyl alcohol-based film, or an ethylene-vinyl acetate copolymer-based partially saponified film on which a dichroic substance, such as iodine or a dichroic dye, has been adsorbed, and a polyene-based alignment film, such as a product obtained by subjecting polyvinyl alcohol to dehydration treatment or a product obtained by subjecting polyvinyl chloride to dehydrochlorination treatment. Of those, a polarizer obtained by uniaxially stretching a polyvinyl alcohol-based film in which a dichroic substance, such as iodine, has been adsorbed is particularly preferred for its high polarized dichroic ratio. The thickness of the polarizer is preferably from 0.5 µm to 80 µm.

Any appropriate film is used as the protective film. Specific examples of a material serving as a main component of such film include: cellulose-based resins, such as triacetylcellulose (TAC); and transparent resins, such as a (meth)acrylic resin, a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, and an acetate-based resin. Another example thereof is a thermosetting resin or a UV-curable resin, such as an acrylic resin, a urethane-based resin, an acrylic urethane-based resin, an epoxy-based resin, or a silicone-based resin. Still another example thereof is a glassy polymer, such as a siloxane-based polymer. In addition, a polymer film described in JP 2001-343529 A (WO 01/37007 A1) may also be used. As a material for the film, for example, there may be used a resin composition containing a thermoplastic resin having a substituted or unsubstituted imide group in a side chain and a thermoplastic resin having a substituted or unsubstituted phenyl group and a nitrile group in a side chain. An example thereof is a resin composition containing an alternate copolymer formed of isobutene and N-methylmaleimide and an acrylonitrile-styrene copolymer. The polymer film may be, for example, an extruded product of the resin composition.

B-3. Surface Light Source Device

As the surface light source device configured to emit light having directivity in the approximately normal direction of the light emitting surface, from the viewpoint of thinning, there is preferably used a surface light source device of an edge light system including a light source unit and a light guide plate configured to cause light from the light source unit to enter from a side surface (light incident surface) opposed to the light source unit, and to emit the light from a viewer-side surface (light emitting surface). The surface light source device of an edge light system may be a surface light source device called a single-lamp type in which the light source unit is arranged along one side surface of the light guide plate or may be a surface light source device called a two-lamp type in which the light source units are respectively arranged along two opposed side surfaces of the light guide plate.

The light source unit may be formed of a plurality of point light sources arrayed along the side surface of the light guide plate. As the point light source, a light source configured to emit light having high directivity is preferred, and for example, an LED may be used.

The light guide plate may have a configuration capable of emitting the light having directivity. As such light guide plate, for example, light guide plates described in JP 2000-171798 A and JP 2005-123363 A may be used. Alternatively, the light guide plate may have a configuration capable of emitting the light having directivity in cooperation with other optical members, such as a prism sheet and a louver sheet, as described in U.S. Pat. No. 5,396,350 A, U.S. Pat. No. 5,555,329 A, JP 2001-305306 A, and JP 3071538 B2.

The surface light source device may further include any appropriate optical member, such as a reflecting plate, for the purpose of improving brightness or the like.

In one embodiment, the surface light source device is configured to emit, from the light emitting surface, light which has directivity in the approximately normal direction of the light emitting surface, and which contains a linearly polarized light component that vibrates in a specific direction at a high ratio. When polarized light or partially polarized light having directivity is caused to enter the liquid crystal panel so that the vibration direction thereof is parallel to the transmission axis of the back surface-side polarizing plate as described above, light use efficiency can be improved, and the viewing angle at the time of narrow viewing angle setting can be further narrowed.

The linearly polarized light component that vibrates in a specific direction may be, for example, a polarized light component (for example, a P-polarized light component) that vibrates in a plane approximately parallel to the light guide direction of light of the light guide plate or a polarized light component (for example, an S-polarized light component) that vibrates in a direction perpendicular to the plane, and is more preferably the P-polarized light component. When the light having directivity and containing the P-polarized light component at a high ratio is caused to enter the liquid crystal panel with the vibration direction of the P-polarized light component being matched with the transmission axis direction of the back surface-side polarizing plate, the viewing angle at the time of narrow viewing angle setting can be further narrowed as compared to the case of using light containing the S-polarized light component at a high ratio. The light control film used in the present invention is formed through use of a transparent substrate having a small front retardation, and has a high transmittance. Therefore, the light control film can allow the light emitted from the surface light source device to enter the liquid crystal panel without substantially changing the directivity and polarization state thereof. With this, the effects of the present invention can be suitably obtained.

The light emitted from the surface light source device may contain the linearly polarized light component that vibrates in a specific direction at a ratio of preferably 52% or more, more preferably 55% or more. The upper limit of the ratio of the linearly polarized light component is ideally 100%, and may be 60% in one embodiment and 57% in another embodiment. The ratio of the linearly polarized light component in the light emitted from the surface light source device may be determined, for example, in accordance with a method described in JP 2013-190773 A.

Figure 3:
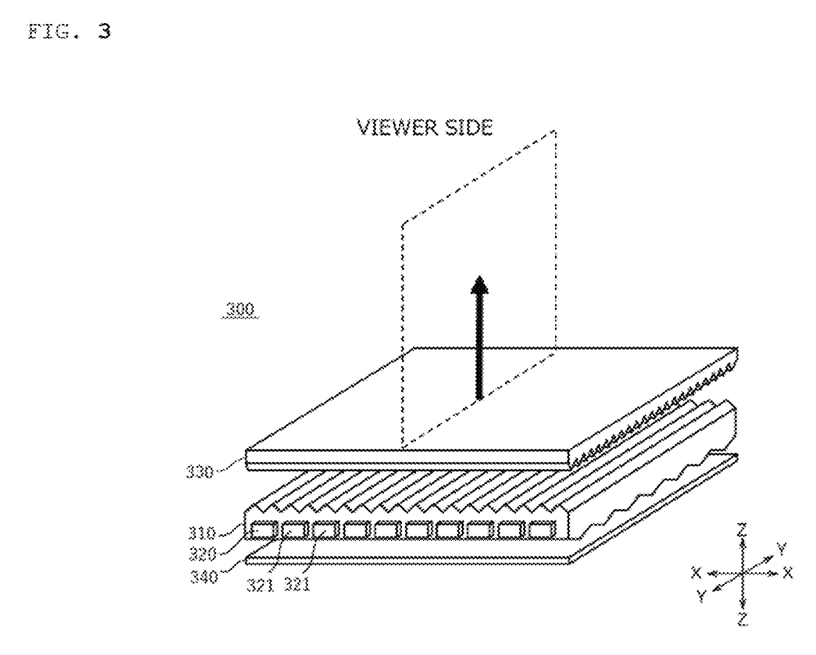
FIG. 3 is a schematic view for illustrating a surface light source device to be used in the liquid crystal display apparatus according to the one embodiment of the present invention.

FIG. 3 is a schematic view for illustrating an example of a surface light source device configured to emit, from the light emitting surface, light which has directivity in the approximately normal direction of the light emitting surface, and which contains a linearly polarized light component (typically, a P-polarized light component) that vibrates in a specific direction at a high ratio. The surface light source device 300 illustrated in FIG. 3 includes a light guide plate 310 which is configured to cause light to enter from a side surface, and to emit the light from a viewer-side surface; a light source unit 320 which includes a plurality of point light sources 321 arranged at predetermined intervals along the side surface (light incident surface) of the light guide plate 310; a prism sheet 330 which is arranged on the viewer side of the light guide plate 310, and has convex portions on a back surface side; and a reflecting plate 340 which is arranged on the back surface side of the light guide plate 310. In the surface light source device 300, the light guide plate 310 is configured to deflect light from a lateral direction in a thickness direction, and to emit the light as light containing a linearly polarized light component (typically, a P-polarized light component) that vibrates in a specific direction at a high ratio. The prism sheet 330 having the convex portions on the back surface side can bring the traveling direction of the light close to the normal direction of the light emitting surface without substantially changing the polarization state of the light.

In FIG. 3, when the direction perpendicular to the light guide direction of light of the light guide plate (array direction of the point light sources) is defined as the X direction, the light guide direction of light of the light guide plate is defined as the Y direction, and the normal direction of the light emitting surface is defined as the Z direction, the polarized light component that vibrates in the YZ plane may be referred to as the P-polarized light component, and the polarized light component that vibrates in the direction vertical to the YZ plane may be referred to as the S-polarized light component.

The light guide plate 310 is configured to cause light from the light source unit 320 to enter from the side surface (light incident surface) opposed to the light source unit 320, and to emit, from the viewer-side surface (light emitting surface), first directivity light which has directivity of maximum intensity in a first direction at a predetermined angle with respect to the normal direction of the light emitting surface in a plane approximately parallel to the light guide direction of light, and which is polarized light containing a polarized light component that vibrates in the plane at a high ratio. In the illustrated example, a line-shaped lens pattern is formed on each of the back surface side and the viewer side of the light guide plate. However, as long as desired light can be emitted, the lens pattern may be formed on only any one of the sides. In addition, the lens pattern is not limited to a line shape, and may be, for example, a pattern in which columnar or pyramidal protrusions are dotted.

The prism sheet 330 includes a prism portion in which a plurality of columnar unit prisms that are convex toward the light guide plate 310 side are arrayed, and is configured to emit the second directivity light which has directivity in an approximately normal direction of the light emitting surface of the prism sheet 330 while substantially maintaining the polarization state of the first directivity light.

The reflecting plate 340 is configured to reflect the light released from the back surface side or the like of the light guide plate 310, and to return the light into the light guide plate 310.

Details of the light guide plate 310, the prism sheet 330, and the reflecting plate 340 are described in, for example, JP 2013-190778 A and JP 2013-190779 A, the descriptions of which are incorporated herein by reference in their entirety.

In addition, the surface light source device configured to emit, from the light emitting surface, light which has directivity in the approximately normal direction of the light emitting surface, and which contains the linearly polarized light component that vibrates in a specific direction at a high ratio is not limited to the above-mentioned illustrated example, and any appropriate surface light source device may be used. For example, a surface light source device described in JP 09-54556 A, or a surface light source device using, for example, a polarized light beam splitter or a polarized light conversion element (e.g., a device described in JP 2013-164434 A, JP 2005-11539 A, JP 2005-128363 A, JP 07-261122 A, JP 07-270792 A, JP 09-138406 A, or JP 2001-332115 A) may be used.

B-4. Production Method for Liquid Crystal Display Apparatus

The liquid crystal display apparatus may be produced, for example, by arranging optical members, such as a liquid crystal panel, a light control film, and a surface light source device, in a housing so as to have a predetermined configuration. For example, in the case of using a surface light source device configured to emit, from a light emitting surface, light which has directivity in an approximately normal direction of the light emitting surface and which contains a linearly polarized light component that vibrates in a specific direction at a high ratio, the surface light source device is arranged so that the vibration direction of the linearly polarized light component (preferably, a P-polarized light component) is parallel to the transmission axis of a back surface-side polarizing plate of a liquid crystal panel. With this, the improvement of light use efficiency and narrower viewing angle display can be achieved. Specifically, the surface light source device illustrated in FIG. 3 is preferably arranged so that the light guide direction of the light guide plate (in other words, the vibration direction of the P-polarized light component to be emitted or the Y direction) is parallel to the transmission axis of the back surface-side polarizing plate of the liquid crystal display panel.

In production of the liquid crystal display apparatus, the respective optical members may be arranged close to or in contact with each other without being bonded to each other via an adhesion layer. Alternatively, the adjacent optical members may be bonded to each other via the adhesion layer as required. The adhesion layer is typically an adhesive layer or a pressure-sensitive adhesive layer.

In one embodiment, a liquid crystal display apparatus may be obtained by arranging a light control film on a viewer side of the surface light source device in advance to produce a backlight unit and arranging a liquid crystal panel on a viewer side (light control film side) of the backlight unit.

In another embodiment, a liquid crystal display apparatus may be obtained by bonding a light control film to a back surface side of a liquid crystal panel in advance to integrate the light control film with the liquid crystal panel and arranging the surface light source device on a back surface side (light control film side) of the liquid crystal panel integrated with the light control film.

B-5. Viewing Angle Characteristics of Liquid Crystal Display Apparatus

In one embodiment, in the liquid crystal display apparatus, at the time of narrow viewing angle setting, the brightness in an oblique direction is desirably less than 3%, more desirably less than 2%, still more desirably less than 1% with respect to the brightness in a front direction. For example, when, regarding the emitting surface (display screen) of the liquid crystal display apparatus, the direction parallel to the light guide direction of light of the light guide plate is defined as the vertical direction, and the direction perpendicular thereto is defined as the horizontal direction, it is preferred that the brightness at a polar angle of 40° or more be 2% or less with respect to the brightness in the front direction (polar angle: 0°) in any one or both of the horizontal and vertical directions within the emitting surface, and it is more preferred that the brightness at a polar angle of 50° or more be 1% or less with respect to the brightness in the front direction (polar angle: 0°) in the horizontal direction within the emitting surface. Meanwhile, at the time of wide viewing angle setting, the brightness at a polar angle of 40° is preferably 5% or more with respect to the brightness in the front direction, more preferably 2 or more and 20 or less times as large as that at the time of narrow viewing angle setting. When the brightness at the time of wide viewing angle setting falls within the above-mentioned ranges, it is possible to ensure practically acceptable visibility and wide viewing angle characteristics under a situation in which it is not required to consider peeping or the like.

C. Backlight Unit

A backlight unit includes the surface light source device described in the section B. In one embodiment, the backlight unit has a configuration which further includes the light control film described in the section A, and in which the light control film is arranged on the light emitting surface side of the surface light source device. In this case, the light control film may be bonded to the light emitting surface (for example, a viewer-side surface of a prism sheet) of the surface light source device via an adhesion layer.

EXAMPLES

The present invention is specifically described below by way of Examples, but the present invention is not limited to these Examples. Test and evaluation methods in Examples are as described below. In addition, "parts" and "%" in Examples are weight-based units unless otherwise stated.

(1) Brightness

A white screen was displayed on a liquid crystal display apparatus obtained in each of Examples and Comparative Examples, and a brightness was measured through use of a brightness meter (manufactured by AUTRONIC-MELCHERS GmbH, product name "Conoscope").

(2) Parallel Light Transmittance

When the following total light transmittance and haze are measured, calculation is performed by the equation: parallel light transmittance=total light transmittance*(1−haze).

(3) Total Light Transmittance

A total light transmittance was measured based on JIS K 7361 through use of "MDH-4000" (product name) manufactured by Nippon Denshoku Industries Co., Ltd.

(4) Front Retardation

A front retardation was measured at a wavelength of 590 nm and 23° C. through use of "AxoScan" (product name) manufactured by Axometrics.

(5) Haze

A haze was measured based on JIS K 7136 through use of "MDH-4000" (product name) manufactured by Nippon Denshoku Industries Co., Ltd.

(6) Thickness

A thickness was measured through use of a digital micrometer (manufactured by Anritsu Corporation, product name "KC-351C").

Example 1

(First Transparent Conductive Film)

On one surface of a transparent substrate (norbornene-based resin film (manufactured by Zeon Corporation, product name "ZF-16", thickness: 40 μm, front retardation: 5 nm), a $SiO_x$ (x=1.5) layer having a thickness of 3 nm, and a $SiO_2$ layer having a thickness of 17 nm formed on the $SiO_x$ layer were formed in the stated order by sputtering to form a refractive index adjusting layer. Next, a transparent electrode layer (ITO layer) having a thickness of 0.08 μm was formed on the refractive index adjusting layer by sputtering, and then crystallized by annealing at 150° C. Thus, a transparent conductive film A having a configuration of [COP substrate/refractive index adjusting layer/transparent electrode layer] was obtained.

(Second Transparent Conductive Film)

The transparent conductive film A was used as a second transparent conductive film.

(Light Control Layer)

An application liquid containing 40 parts of a liquid crystal compound (manufactured by HCCH, product name "HPC854600-100", birefringence Δn=0.232) and 60 parts (solid content) of a UV-curable resin (manufactured by Norland, product name "NOA65") were applied onto the surface of the first transparent conductive film on the transparent electrode layer side, to thereby form an application layer. Next, the second transparent conductive film was laminated on the application layer so that the transparent electrode layer was opposed to the application layer. The obtained laminate was irradiated with UV light to cure the UV-curable resin, to thereby form a light control layer (normal mode) having a thickness of 10 μm. Thus, a light control film A was obtained.

Through use of an AC power supply "EC750SA" manufactured by NF Corporation, an AC voltage was applied to the light control film A while being boosted to 20 V, and the haze, parallel light transmittance, and total light transmittance at the time of application of various voltages were observed. The results are shown in Table 1.

TABLE 1

| Voltage (V) | Haze (%) | Parallel light transmittance (%) | Total light transmittance (%) |
| --- | --- | --- | --- |
| 0 | 89.8 | 10.3 | 89.8 |
| 2 | 87.3 | 12.7 | 89.8 |
| 4 | 52.9 | 44.5 | 89.9 |
| 6 | 28.7 | 65.6 | 89.9 |
| 8 | 16.8 | 75.6 | 90.0 |
| 10 | 11.7 | 79.8 | 90.0 |
| 12 | 9.4 | 81.7 | 90.0 |
| 14 | 8.1 | 82.8 | 90.0 |
| 16 | 7.3 | 83.4 | 90.0 |
| 18 | 6.7 | 84.0 | 90.0 |
| 20 | 6.1 | 84.5 | 90.0 |

Comparative Example 1

(First Transparent Conductive Film)

A transparent conductive film B having a configuration of [PET substrate/transparent electrode layer] was obtained by forming a transparent electrode layer (ITO layer) having a thickness of 0.08 μm on one surface of a polyethylene terephthalate film (manufactured by Toyobo Co., Ltd., product name "A4300", thickness: 138 μm, front retardation: 12,000 nm) serving as a transparent substrate by sputtering.

(Second Transparent Conductive Film)

The transparent conductive film B was used as a second transparent conductive film.

(Light Control Layer)

A light control layer was formed in the same manner as in Example 1. A light control film B was obtained as described above.

Through use of an AC power supply "EC750SA" manufactured by NF Corporation, an AC voltage was applied to the light control film B while being boosted to 20 V, and the haze, parallel light transmittance, and total light transmittance at the time of application of various voltages were observed. The results are shown in Table 2.

TABLE 2

| Voltage (V) | Haze (%) | Parallel light transmittance (%) | Total light transmittance (%) |
| --- | --- | --- | --- |
| 0 | 89.9 | 9.0 | 78.8 |
| 2 | 88.9 | 9.8 | 78.8 |
| 4 | 69.7 | 25.7 | 78.9 |
| 6 | 41.8 | 47.8 | 78.9 |
| 8 | 23.3 | 61.7 | 79.0 |
| 10 | 15.1 | 67.7 | 79.0 |
| 12 | 10.9 | 70.7 | 79.0 |
| 14 | 8.6 | 72.5 | 79.0 |
| 16 | 7.3 | 73.4 | 79.0 |
| 18 | 6.3 | 74.1 | 79.0 |
| 20 | 5.5 | 74.7 | 79.0 |

Example 2

(Liquid Crystal Panel)

A viewer-side polarizing plate and a back surface-side polarizing plate were peeled from a 13.3-inch liquid crystal panel having a configuration of [viewer-side polarizing plate/IPS mode liquid crystal cell (resolution: 167 ppi)/back surface-side polarizing plate] mounted on a notebook computer (manufactured by Deli, product name "Inspiron 13 7000"), and polarizing plates (product name "CVT1764FCUHC") manufactured by Nitto Denko Corporation were bonded to the liquid crystal cell so that the transmission axis of a viewer-side polarizing plate was parallel to a long side axis of the panel and the transmission axis of a back surface-side polarizing plate was parallel to a short side axis of the panel. Thus, a liquid crystal panel was obtained.

(Light Control Film)

The light control film A produced in Example 1 was used.

(Surface Light Source Device)

A surface light source device was removed from a notebook computer (manufactured by HP, product name "Elite-Book x360"). The removed surface light source device included a light guide plate, a light source unit including a plurality of LED light sources arranged at predetermined intervals along one side surface on a long side of the light guide plate, a prism sheet which was arranged on a viewer-side of the light guide plate, had a prism shape that was convex toward a back surface side, and had a viewer-side surface subjected to mat treatment, and a reflecting plate arranged on a back surface side of the light guide plate. The mat treatment of an outermost surface of the prism sheet incorporated in the surface light source device was removed with a solvent, and the prism sheet was arranged again on the light guide plate, to thereby obtain a surface light source device. The obtained surface light source device is configured to emit, from a light emitting surface (viewer-side surface of the prism sheet), light which has directivity in an approximately normal direction of the light emitting surface, and which contains a linearly polarized light component that vibrates in a direction parallel to a light guide direction of light of the light guide plate (short side axis direction of the light guide plate) at a high ratio.

(Liquid Crystal Display Apparatus)

The liquid crystal panel, the light control film A, and the surface light source device were arranged in the stated order from the viewer side to produce a liquid crystal display apparatus A. In the obtained liquid crystal display apparatus, the transmission axis of the back surface-side polarizing plate of the liquid crystal panel and the vibration direction of the linearly polarized light component contained in emitted light from the surface light source device were parallel to each other.

Comparative Example 2

A liquid crystal display apparatus B was produced in the same manner as in Example 2 except that the light control film B was used instead of the light control film A.

Comparative Example 3

A liquid crystal display apparatus C was produced in the same manner as in Example 2 except that the light control film was not arranged.

<Evaluation of Display Characteristics>

In each of the obtained liquid crystal display apparatus A and B, a voltage was applied to the light control film while being boosted to 100 V, and the brightness of a display screen at the time of application of various voltages was measured.

Figure 4A:
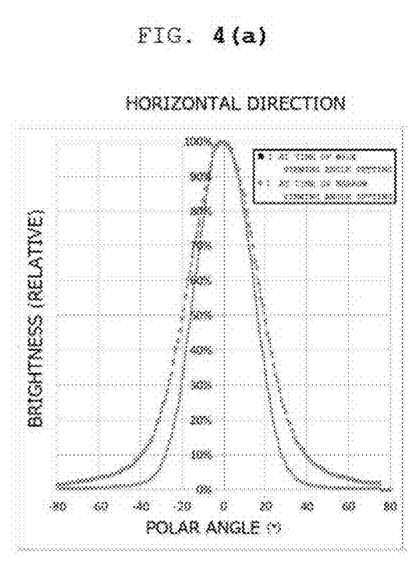
FIG. 4(a) and FIG. 4(b) are graphs for showing polar angle dependency of brightness in a horizontal direction FIG. 4(a) and a vertical direction FIG. 4(b) of a display screen of a liquid crystal display apparatus A at the time of application of no voltage and at the time of application of a voltage.
Figure 4B:
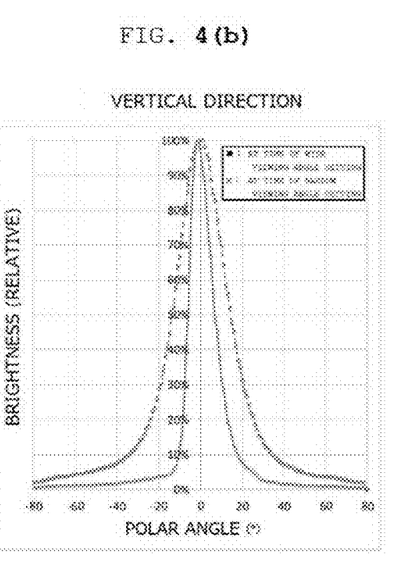

Viewing angle characteristics of the brightness of the display screen of the liquid crystal display apparatus A at the time of application of no voltage (at the time of wide viewing angle setting) and at the time of application of a voltage of 100 V (at the time of narrow viewing angle setting) are shown in FIG. 4(a) and FIG. 4(b). Specifically, in FIG. 4(a), there is shown polar angle dependency of brightness in a direction perpendicular to the light guide direction of light of the light guide plate (in other words, a direction parallel to the array direction of LED light sources, hereinafter referred to as "horizontal direction"), and in FIG. 4(b), there is shown polar angle dependency of brightness in a direction parallel to the light guide direction of light of the light guide plate (in other words, a direction perpendicular to the array direction of the LED light sources, hereinafter referred to as "vertical direction").

It is understood from FIG. 4(a) and FIG. 4(b) that the liquid crystal display apparatus A can be switched between wide viewing angle display and narrow viewing angle display by changing the application state of a voltage.

Figure 5A:
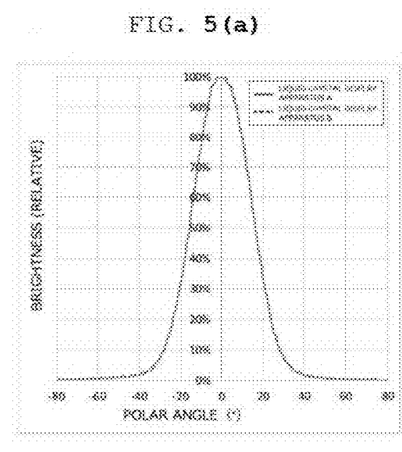
FIG. 5(a) to FIG. 5(d) are a graph FIG. 5(a) for showing polar angle dependency of brightness in the horizontal direction of the display screen of each of the liquid crystal display apparatus A and B at the time of narrow viewing angle setting and a graph FIG. 5(c) for showing enlarged main parts thereof, and a graph FIG. 5(b) for showing polar angle dependency of brightness in the vertical direction of the display screen of each of the liquid crystal display apparatus A and B at the time of narrow viewing angle setting and a graph FIG. 5(d) for showing enlarged main parts thereof.
Figure 5B:
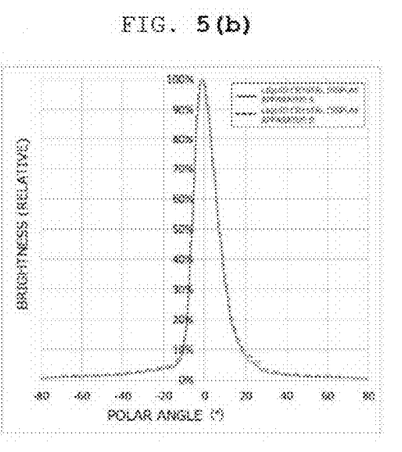
Figure 5C:
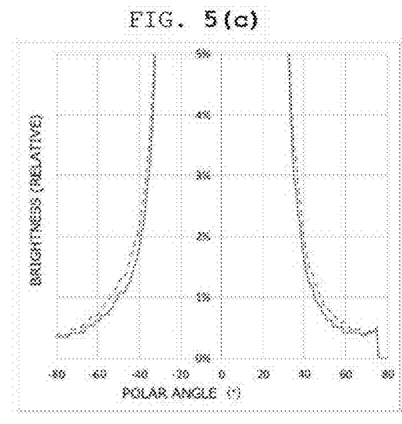
Figure 5D:
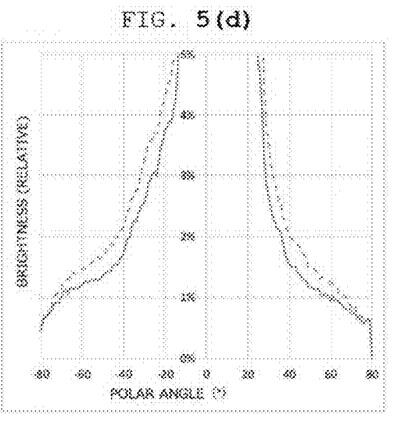

In addition, FIG. 5(a) to FIG. 5(d) are each a graph for showing viewing angle dependency of brightness in each display screen of the liquid crystal display apparatus A and B at the time of application of a voltage of 100 V (that is, at the time of narrow viewing angle setting). Specifically, FIG. 5(a) is a graph for showing polar angle dependency of brightness in the horizontal direction, and FIG. 5(c) is a graph for showing enlarged main parts thereof. In addition, FIG. 5(b) is a graph for showing polar angle dependency of brightness in the vertical direction, and FIG. 5(d) is a graph for showing enlarged main parts thereof.

As shown in FIG. 5(a) to FIG. 5(d), the liquid crystal display apparatus A can achieve viewing angle display narrower than that of the liquid crystal display apparatus B.

Figure 6:
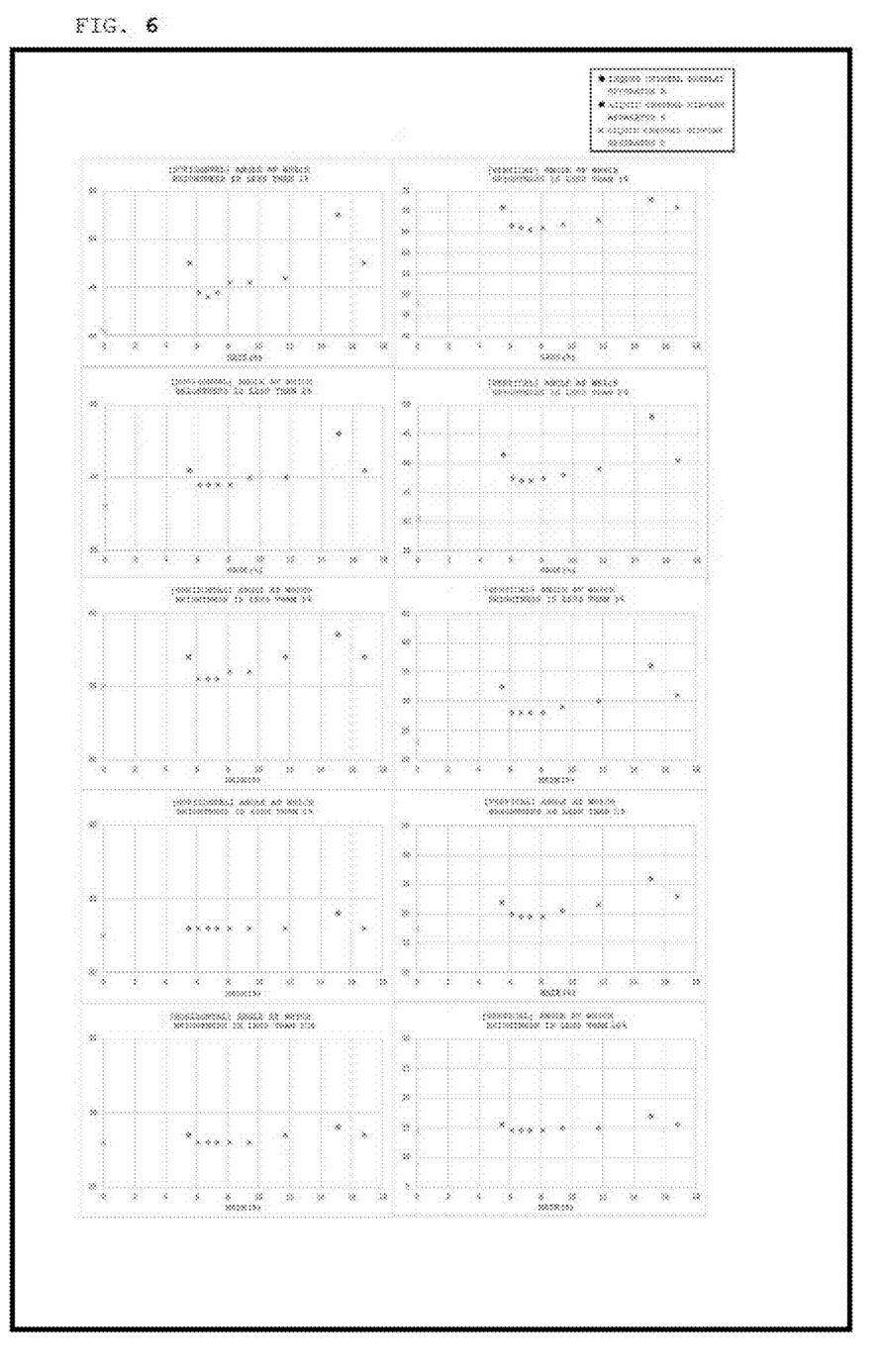
FIG. 6 includes graphs fore showing a relationship between an angle (polar angle) at which brightness is less than 1%, less than 2%, less than 3%, less than 5%, or less than 10% with respect to brightness in a front direction (polar angle: 0°) and a haze of a light control film in this case at the time of application of each voltage.

In addition, regarding the liquid crystal display apparatus A and B at the time of application of each voltage, an angle (polar angle) at which brightness was less than 1%, less than 2%, less than 3%, less than 5%, and less than 10% with respect to the brightness in a front direction (polar angle: 0°) in the horizontal direction and the vertical direction was determined, and a relationship between the angle and the haze of each of the light control films A and B at the time of application of each voltage was shown in a graph. The results are shown in FIG. 6 (in FIG. 6, "●" represents the results of the liquid crystal display apparatus A, and "■" represents the results of the liquid crystal display apparatus B). In FIG. 6, a polar angle (represented by "x") with respect to a haze of 0% is an angle (polar angle) at which the above-mentioned predetermined brightness is obtained with respect to the brightness in the front direction (polar angle: 0°) in the liquid crystal display apparatus C.

In general, in order to prevent peeping of a display screen from an oblique direction, the brightness in the oblique direction is preferably less than 3%, more preferably less than 2%, still more preferably less than 1% with respect to the brightness in the front direction. In this context, regarding the angle at which the brightness was less than 10% and the angle at which the brightness was less than 5%, a large difference was not recognized between the liquid crystal display apparatus A (light control film A) and the liquid crystal display apparatus B (light control film B). Meanwhile, regarding the angle at which the brightness was less than 3%, the angle at which the brightness was less than 2%, and the angle at which the brightness was less than 1%, narrower viewing was able to be achieved in the liquid crystal display apparatus A as compared to the liquid crystal display apparatus B, even when the light control film A had a haze larger than that of the light control film B.

Further, front brightnesses (cd/m$^2$) of the liquid crystal display apparatus A and B in the light transmitting state (application voltage: 50 V) and the light scattering state (application voltage: 0 V) are shown in Table 3. As shown in Table 3, the liquid crystal display apparatus A can achieve a front brightness higher than that of the liquid crystal display apparatus B. A brightness increase rate in the light scattering state ((brightness at the time of application of a voltage of 0 V in the liquid crystal display apparatus A−brightness at the time of application of a voltage of 0 V in liquid crystal display apparatus B)/brightness at the time of application of a voltage of 0 V in the liquid crystal display apparatus B×100=21.4 (%)) is the effect equivalent to or more than a transmittance increase rate of the light control film ((total light transmittance at the time of application of a voltage of 0 V in the light control film A−total light transmittance at the time of application of a voltage of 0 V in the light control film B)/total light transmittance at the time of application of a voltage of 0 V in the light control film B×100=13.9 (%)).

TABLE 3

| Application voltage (V) | Front brightness (cd/m$^2$) | |
| --- | --- | --- |
| | Liquid crystal display apparatus A | Liquid crystal display apparatus B |
| 0 | 176 | 145 |
| 50 | 500 | 428 |

INDUSTRIAL APPLICABILITY

The present invention may be suitably used for liquid crystal display apparatus, such as a cellular phone and a notebook computer.

REFERENCE SIGNS LIST 1 liquid crystal display apparatus
10 transparent substrate
20 transparent electrode layer
30 light control layer
40 refractive index adjusting layer
100 light control film
200 liquid crystal panel
300 surface light source device
310 light guide plate
320 light source unit
330 prism sheet
340 reflecting plate

The invention claimed is:

1. A light control film, comprising:
a first transparent substrate;
a first transparent electrode layer;
a light control layer which contains a liquid crystal compound, and which enables switching between a light transmitting state and a light scattering state in accordance with a voltage to be applied;
a second transparent electrode layer; and
a second transparent substrate in the stated order,
wherein the first transparent substrate has a front retardation of 50 nm or less,
wherein the second transparent substrate has a front retardation of 50 nm or less,
wherein the light control film has a total light transmittance of from 85% to 99% in the light transmitting state, and
the light control layer comprises a light control layer containing a polymer-dispersed liquid crystal having a structure in which a liquid crystal compound in the form of droplets is dispersed in a polymer matrix or a light control layer containing a polymer-network liquid crystal having a structure in which a liquid crystal compound is dispersed in a polymer network.

2. The light control film according to claim 1, further comprising a refractive index adjusting layer between the first transparent substrate and the first transparent electrode layer and/or between the second transparent substrate and the second transparent electrode layer.

3. The light control film according to claim 1, further comprising an antireflection layer on an opposite side to a side of the first transparent substrate on which the first transparent electrode layer is arranged and/or on an opposite side to a side of the second transparent substrate on which the second transparent electrode layer is arranged.

4. The light control film according to claim 1, wherein the first transparent substrate and the second transparent substrate each contain a cycloolefin-based resin.

5. The light control film according to claim 1, wherein the light control film has a haze of 15% or less in the light transmitting state.

6. The light control film according to claim 1, wherein the light control film has a total light transmittance of from 85% to 99% in each of the light transmitting state and the light scattering state.

7. A liquid crystal display apparatus, comprising in an order from a viewer side:
a liquid crystal panel including a liquid crystal cell, a viewer-side polarizing plate arranged on the viewer side of the liquid crystal cell, and a back surface-side polarizing plate arranged on an opposite side to the viewer side of the liquid crystal cell;
the light control film of claim 1; and
a surface light source device configured to emit, from a light emitting surface opposed to the light control film, light having directivity in an approximately normal direction of the light emitting surface.

8. The liquid crystal display apparatus according to claim 7,
wherein the surface light source device is configured to emit light which has directivity in the approximately normal direction of the light emitting surface opposed to the light control film, and which contains a linearly polarized light component that vibrates in a specific direction at a high ratio, and
wherein a vibration direction of the linearly polarized light component is approximately parallel to a transmission axis of the back surface-side polarizing plate.

9. The liquid crystal display apparatus according to claim 8,
wherein the surface light source device includes a light source unit, and a light guide plate configured to cause light from the light source unit to enter from a side surface opposed to the light source unit, and to emit the light from a viewer-side surface, and
wherein the linearly polarized light component vibrates in a plane approximately parallel to a light guide direction of the light of the light guide plate.

10. The light control film according to claim 1, wherein the light control film has a haze of 10% or less in the light transmitting state.

11. The light control film according to claim 1, wherein the light control film has a haze of from 50% to 99% in the light scattering state.

12. The light control film according to claim 1, wherein the light control layer is in the light transmitting state at the time of application of a voltage, and the light control layer is in the light scattering state at the time of application of no voltage.

* * * * *